United States Patent
Zandiyeh

(10) Patent No.: US 9,464,738 B2
(45) Date of Patent: Oct. 11, 2016

(54) HYBRID HOSE REINFORCEMENTS

(71) Applicant: Ali Reza Zandiyeh, Louth (GB)

(72) Inventor: Ali Reza Zandiyeh, Louth (GB)

(73) Assignee: DUNLOP OIL & MARINE LIMITED, Grimsby (GB)

( * ) Notice: Subject to any disclaimer, the term of this patent is extended or adjusted under 35 U.S.C. 154(b) by 0 days.

(21) Appl. No.: 14/264,931

(22) Filed: Apr. 29, 2014

(65) Prior Publication Data

US 2014/0230947 A1    Aug. 21, 2014

Related U.S. Application Data

(63) Continuation of application No. 11/630,871, filed as application No. PCT/GB2005/000420 on Feb. 8, 2005, now Pat. No. 8,746,288.

(30) Foreign Application Priority Data

Jun. 23, 2004 (GB) .................................. 0414022.4

(51) Int. Cl.
| | |
|---|---|
| F16L 11/00 | (2006.01) |
| F16L 11/04 | (2006.01) |
| B32B 1/08 | (2006.01) |
| B32B 5/26 | (2006.01) |
| B32B 5/28 | (2006.01) |
| D02G 3/04 | (2006.01) |
| F16L 11/08 | (2006.01) |

(52) U.S. Cl.
CPC ............... *F16L 11/04* (2013.01); *B32B 1/08* (2013.01); *B32B 5/26* (2013.01); *B32B 5/28* (2013.01); *D02G 3/047* (2013.01); *F16L 11/088* (2013.01); *Y10T 428/1393* (2015.01)

(58) Field of Classification Search
CPC ...... F16L 11/08; F16L 11/085; F16L 11/086; F16L 11/088
USPC ................. 138/123, 124, 125, 126
See application file for complete search history.

(56) References Cited

U.S. PATENT DOCUMENTS

| | | | | |
|---|---|---|---|---|
| 2,598,022 | A * | 5/1952 | Smith ........................... | 138/119 |
| 3,056,429 | A * | 10/1962 | Wilberg ............... | B29D 23/001 |
| | | | | 138/126 |
| 4,142,554 | A * | 3/1979 | Washkewicz et al. ....... | 138/125 |
| 4,155,394 | A * | 5/1979 | Shepherd .............. | B60C 9/0042 |
| | | | | 139/426 R |
| 4,308,895 | A * | 1/1982 | Greco ........................... | 138/125 |
| 4,528,223 | A * | 7/1985 | Kumazawa et al. ......... | 428/34.5 |
| 5,346,731 | A * | 9/1994 | Nakanishi ..................... | 428/34.5 |
| 5,795,635 | A * | 8/1998 | Iwasaki ........................ | 428/36.3 |
| 5,910,361 | A * | 6/1999 | Guevel et al. ................ | 428/364 |
| 8,746,288 | B2 * | 6/2014 | Zandiyeh ..................... | 138/126 |
| 2006/0177656 | A1* | 8/2006 | Kolmes et al. ............... | 428/364 |
| 2008/0072984 | A1* | 3/2008 | Branch et al. ................ | 138/124 |
| 2008/0085645 | A1* | 4/2008 | Prickett ............ | A41D 19/01505 |
| | | | | 442/123 |
| 2009/0071117 | A1* | 3/2009 | Hegan, Jr. ................ | D02G 3/28 |
| | | | | 57/230 |
| 2012/0137649 | A1* | 6/2012 | Kochmann .............. | D02G 3/46 |
| | | | | 57/211 |

FOREIGN PATENT DOCUMENTS

GB          2149048          *  6/1985

* cited by examiner

*Primary Examiner* — James Hook
(74) *Attorney, Agent, or Firm* — McDonald Hopkins, LLC

(57) ABSTRACT

A crush resistant hose comprises a plurality of layers comprising a reinforcing carcass formed from a mixture of multifilament fibers including at least one of polyester, aramide, nylon and rayon.

10 Claims, 2 Drawing Sheets

| Description | | | | hybrid 1 | | hybrid 2 | | hybrid 3 | | Twaron control | | rayon control | | nylon control | |
|---|---|---|---|---|---|---|---|---|---|---|---|---|---|---|---|
| Description | 1st | Rubber | unit | x̄ | ± c.i. | x̄ | ± c.i. | x̄ | ± c.i. | x̄ | ± c.i. | x̄ | ± c.i. | x̄ | ± c.i. |
| LD not corrected DPU | | | dtex | 17679 | ± 56 | 18430 | ± 90 | 17740 | ± 140 | 17670 | ± 60 | 8250 | ± 120 | 25380 | ± 230 |
| Dip pick-up (LD method) | | | % | 4.2 | ± 0.0 | 6.0 | ± 0.1 | 4.4 | ± 0.1 | 4.2 | ± 0.1 | 6.2 | ± 0.8 | 6.2 | ± 0.8 |
| Breaking strength | | | N | 1845 | ± 53 | 1620 | ± 110 | 1894 | ± 33 | 2822 | ± 38 | 293.8 | ± 2.3 | 1597 | ± 37 |
| Breaking tenacity | | | mN/tex | 1087 | ± 32 | 932 | ± 64 | 1115 | ± 20 | 1664 | ± 23 | 372 | ± 2.9 | 629 | ± 16 |
| Elongation at break | | | % | 7.5 | ± 0.1 | 7.7 | ± 0.3 | 6.6 | ± 0.1 | 5.4 | ± 0.1 | 16.6 | ± 0.4 | 29.1 | ± 2.1 |
| Force at spec.elong. | 0.5 | | N | 116 | ± 3 | 107 | ± 3 | 127 | ± 2 | 198 | ± 5 | 23 | ± 1 | 30 | ± 1 |
| Force at spec.elong. | 1 | | N | 187 | ± 4 | 169 | ± 4 | 210 | ± 2 | 382 | ± 6 | 45 | ± 1 | 50 | ± 2 |
| Force at spec.elong. | 2 | | N | 328 | ± 5 | 285 | ± 6 | 380 | ± 5 | 769 | ± 8 | 73 | ± 1 | 84 | ± 2 |
| Force at spec.elong. | 3 | | N | 491 | ± 11 | 417 | ± 10 | 585 | ± 9 | 1232 | ± 11 | 84 | ± 1 | 107 | ± 2 |
| Force at spec.elong. | 5 | | N | 941 | ± 23 | 786 | ± 23 | 1187 | ± 18 | 2515 | ± 22 | 107 | ± 2 | 149 | ± 3 |
| Elong.at spec.force | 550 | | % | 3.3 | ± 0.1 | 3.8 | ± 0.1 | 2.8 | ± 0.0 | 1.4 | ± 0.0 | #NA | | 14.1 | ± 0.2 |
| Elong.at spec.force | 1590 | | % | 6.9 | ± 0.1 | 7.6 | ± 0.2 | 6.0 | ± 0.1 | 3.6 | ± 0.0 | #NA | | 28.4 | ± 0.3 |
| Chord modulus | | | Gpa | 16.7 | ± 0.4 | 15.4 | ± 0.3 | 19.4 | ± 0.2 | 31.8 | ± 0.4 | #NA | | 5.3 | ± 0.1 |
| Dip eff.-absolute | | | % | 97.7 | ± 5.4 | 108 | ± 12 | 100.7 | ± 3.4 | 107.6 | ± 3.2 | #NA | | #NA | |
| Twist dip eff.-abs. | | | % | 56.8 | ± 2.4 | 49.9 | ± 3.8 | 58.3 | ± 2 | 86.9 | ± 2.9 | #NA | | #NA | |
| Single twist (S:neg) | | | tpm | -183 | ± 4 | -190 | ± 1 | -175 | ± 3 | -177 | ± 3 | 228 | ± 12 | 165 | ± 5.2 |
| Cord twist (S:neg) | | | tpm | 179 | ± 8 | 180 | ± 5 | 163 | ± 3 | 164 | ± 3 | -224 | ± 6 | -134 | ± 7 |
| Cord thickness | | | mm | 1.55 | ± 0.02 | 1.59 | ± 0.02 | 1.55 | ± 0.02 | 1.51 | ± 0.04 | 1.01 | ± 0.06 | 1.95 | ± 0.24 |
| Strap peel force | | r838 | N/2cm | 258 | ± 24 | 258 | ± 11 | 241 | ± 9 | 255 | ± 14 | 240 | ± 14 | #NA | |
| Strap peel rubber coverage | | r838 | % | 95-100 | | 95-100 | | 95-100 | | 95-100 | | 100 | | #NA | |
| Strap peel force | | 5320 | N/2cm | 165 | ± 28 | 123 | ± 23 | 185 | ± 21 | 176 | ± 46 | 169 | ± 31 | #NA | |
| Strap peel rubber cover | | 5320 | % | 0-5* | | 0-5* | | 0-5* | | 0-5* | | 0-5* | | #NA | |
| T-adhesion | | 5320 | N | 870 | ± 170 | 670 | ± 250 | 740 | ± 150 | 770 | ± 170 | 284 | ± 14 | #NA | |
| T-adhesion | | r838 | N | 1110 | ± 80 | 1160 | ± 210 | 1140 | ± 130 | 1200 | ± 70 | 262 | ± 49 | #NA | |
| AFF-per.rel.str. | | r838 | % | 46 | ± 19 | 73 | ± 21 | 32 | ± 11 | 32 | ± 10 | 12.7 | ± 5.5 | #NA | |
| AFF-ret.strength | | r838 | N | 850 | ± 350 | 1190 | ± 320 | 620 | ± 210 | 910 | ± 290 | 37 | ± 16 | #NA | |
| End count warp | | | cnt/dm | | | | | | | | | 80 | ± 6 | | |
| Calculated end count w | | | cnt/dm | 52.1 | | 50.8 | | 52.2 | | 53.5 | | | | 41.5 | ± 1.4 |
| Calculated fabric strength | | | kN/m | 962 | | 822 | | 988 | | 1511 | | 235 | | 663 | |

\* blackening of cords, no sufficient coverage

*Fig. 3*

HYBRID HOSE REINFORCEMENTS

CROSS-REFERENCE TO RELATED APPLICATIONS

This is a continuation application of U.S. patent application Ser. No. 11/630,871 titled "HYBRID HOSE REINFORCEMENT," which is a 371 filing of PCT Patent Application No. PCT/GB05/00420, filed Feb. 8, 2005, which claims priority to United Kingdom Application No. 0414022.4, entitled "HYBRID HOSE REINFORCEMENT," filed Jun. 23, 2004, each of which are hereby incorporated in their entirety The present invention relates to hoses, and in particular to reinforcing layers in large bore crush resistant hoses.

Large bore hoses are used, for example, for transporting large volumes of oil, such as in the loading and unloading of oil tankers. The hoses are exposed to arduous conditions and subjected to high loads. Large bore crush resistant hoses are therefore made up of a number of layers, typically including an inner lining, a reinforcing carcass, crush resistant wires and a cover layer. Each of these layers can be made up of a number of separate sub-layers.

The reinforcing layer is typically made up of cord or yarn that is either simply wound round the hose or woven into a fabric. The properties of the cord need to be selected to give the hose its required physical strength. It is known to make the fabric or cord of the reinforcing layer from Nylon, Rayon, polyester, or aramides such as Kevlar™ or Twaron™. However, these materials have varying physical properties with their own advantages and disadvantages and do not always provide the best properties required. Large bore crush resistant hoses such as those described are used in dynamic applications and it is therefore essential that the material is able to withstand fatigue. It is known to make the fabric or cord from monofilament yarn, staple filament yarn or a combination of any of these. However, the physical properties of these known fabrics do not display the level of resistance to fatigue that is required for a crush resistant hose used in dynamic applications.

Accordingly the present invention provides a crush resistant hose comprising a plurality of layers, one of the layers comprising a reinforcing carcass formed from cord made from a mixture of multifilament fibres including at least one of polyester, aramide, nylon and rayon. Using such a hybrid material allows the best physical properties of each material to be selected and combined, allowing the construction of a significantly lighter and stronger hose. The use of only multifilament yarn provides a material that is both flexible and strong and displays optimal fatigue properties. The multifilament yarns preferably have at least 100 filaments in each yarn. Each filament preferably has a length of the same order as the yarn, preferably of substantially the same length of the yarn.

Preferably, the mixture of fibres comprises two of polyester, aramide, nylon and rayon and may comprise different proportions of each material. Most preferably, the cord is formed from a mixture of multifilament fibres of at least one polyester and at least one aramide.

The mixture of fibres may comprise a higher proportion of aramide than of polyester. Preferably the mixture comprises a ratio of 2 plies of aramide to one ply of polyester. However, it may comprise a ratio of between 1:1 and 4:1, preferably between 1.5:1 and 3:1. This mixture of polyester and aramide fibres increases the strength of the reinforcing layer.

The reinforcing layer may be formed from cord comprising a plurality of the fibres. Preferably, the cords are woven into fabric and may be coated with rubber before being applied to the hose. The cords may lie at an angle α to the longitudinal axis of the hose. The angle α may be between 30° and 55° with the lower limit more preferably being 35° and the upper limit more preferably 50°, still more preferably 45°, and is most preferably approximately 40°. The woven fabric creates a reinforcing layer capable of withstanding the arduous conditions and high loads experienced by the hose. Alternatively, the cord may be wound around the hose without being woven into a fabric.

The cord may comprise 2 plies of aramide and 1 ply of polyester twisted together. Preferably, the plies are twisted at approximately 190 turns per meter. Each aramide ply may comprise 3 plies of yarn, which may be twisted together at approximately 190 turns per meter. Each polyester ply may also comprise 3 plies of yarn, which again may be twisted at about 190 turns per meter. Alternatively, each ply may comprise a mixture of plies of different materials, for example two of aramide yarn and one of polyester yarn. Again, other ratios may be used, for example 3:1, 3:2, 4:1, or 4:3.

Any suitable aramides and polyesters may be used. However, the most preferable aramide is Twaron™ 1008 and the most preferable polyester is Diolen™ 164S.

Preferred embodiments of the present invention will now be described by way of example only with reference to the accompanying drawings in which:

FIG. 3 is a table showing the physical properties of the hybrids and other materials.

Figure 1:
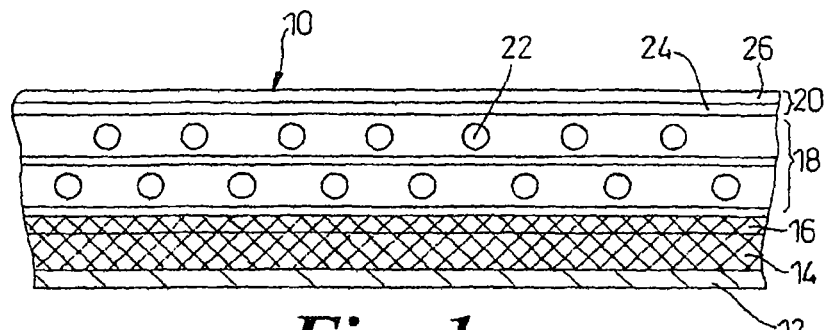
FIG. 1 is a section through a wall of a hose according to an embodiment of the invention.

Referring to FIG. 1, a crush resistant hose 10 according to an embodiment of the invention comprises a number of layers. Starting from the inside of the hose and working outwards, these layers include a lining 12, an inner reinforcing layer 14, an outer reinforcing layer 16, a crush resistant layer 18, and a cover 20. The crush resistant layer 18 comprises one or more separate layers of crush resistant wire 22, in this case two, and the cover 20 comprises two cover layers 24, 26. All of the layers apart from the reinforcing layers are conventional and can be produced so as to be suitable for any specific application.

Figure 2:
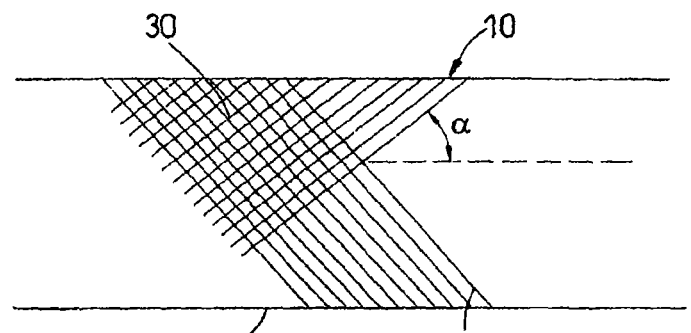
FIG. 2 shows the make-up of a reinforcing layer of the hose of FIG. 1.

The reinforcing layers 14, 16 are formed from a mixture of polyester and aramide multifilament fibres. Referring to FIG. 2, the inner reinforcing layer is made from cords 28 woven into a fabric 30. Although the cords 28 are shown spaced apart in a loose weave for clarity, they are in practice woven closely together to form the fabric. In this embodiment, the fabric 30 is coated in rubber before being applied to the hose. The cords 28 of the fabric lie at an angle α to the longitudinal axis of the hose 10, an angle of approximately 40° in this embodiment. The angle α controls the physical properties of the hose and is chosen so as to satisfy as many of the design requirements as possible. The angle α will vary for different hose designs and generally lies in the range 350 to 55°.

In this embodiment, each cord 28 is made up of 2 plies of the aramide Twaron™ 1008 and one ply of polyester Diolen™ 164S. The three plies are twisted together at approximately 190 turns per meter to form the cord 28. This cord 28 typically has a thickness of approximately 1.55 mm. Each Twaron™ ply is made up of three plies of multifilament 1680 decitex yarn twisted at approximately 190 turns per meter. Each Polyester ply is made up of three plies of multifilament 1670 decitex yarn, also twisted at approximately 190 turns per meter. The use of multifilament yarn instead of monofilament yarn, staple filament yarn or a combination of these has been found to produce a material that displays improved resistance to fatigue. Multifilament yarns comprise hundreds of continuous individual filaments together in one yarn. For example, a typical 1670 decitex Twaron™ yarn comprises approximately 1000 filaments each with a diameter of 12 microns. Multifilament yarns are very flexible and strong and display optimal bending fatigue and tensile fatigue properties compared to monofilaments, which are much stiffer and display poor fatigue properties. Staple filament yarn comprises short lengths of filament wrapped around each other, transferring load along the filament through the friction between the filaments. Staple filament yarn therefore lacks the strength found in continuous multifilament yarn.

Referring to FIG. 3, tests were carried out on the different properties of three slightly different samples of the hybrid cord. The table also shows the results for control samples of Twaron, Rayon and Nylon. Each of the three hybrids has a slightly different number of turns per meter, the single twist of the Twaron™ or polyester of hybrid 1 being about 183 tpm, 190 tpm for hybrid 2 and 175 tpm for hybrid 3. The number of turns per meter of the 3 plies in the cord, the cord twist, is about 179 tpm for hybrid 1, 180 tpm for hybrid 2 and 163 tpm for hybrid 3. The three samples also have a slightly different cord thickness. This is approximately 1.55 mm for hybrids 1 and 3 and 1.59 mm for hybrid 2. The linear density also varies between the three hybrid samples, the values being approximately 17679 dtex, 18430 dtex and 17740 dtex respectively. These values are similar to the linear density of 17670 dtex for the Twaron™ control sample but are much greater than the value of 8250 dtex for the rayon control and smaller than the value of 25380 dtex for the nylon control.

It can be seen from the results that the breaking strength (N) of each of these hybrids is considerably greater than that of the rayon control and is also greater than the nylon control. The breaking strengths of the three hybrids are 1845N, 1620N and 1894N respectively compared to a breaking strength of 293.8N for the rayon control. Only the 100% Twaron™ sample has a greater breaking strength of 2822N. The breaking tenacity of the hybrids is also much greater that of the rayon control. The hybrids have a breaking tenacity of 1087 mN/tex, 932 mN/tex and 1115 mN/tex respectively compared to a breaking tenacity of 372 mN/tex for the rayon control. Again, it is only the 100% Twaron™ sample that has a greater breaking tenacity of 1664 mN/tex.

Another of the properties tested was the elongation at breaking point. This elongation was found to be 7.5%, 7.7% and 6.6% respectively for the 3 hybrids. These compare to a lower value of 5.4% for the Twaron™ control sample and the considerably higher values of 16.6% and 29.1% for the rayon and nylon control samples. The chord modulus also differs between the three hybrids and the Twaron™, being 16.7 GPa, 15.4 GPa and 19.4 GPa for the hybrids and a much higher value of 31.8 GPa for the Twaron™. The greater elongation at breaking point of the hybrid compared to the Twaron™ control, along with its lower modulus, is one of the key advantages of the hybrid over the Twaron™. It enables the hybrid to load share better than the 100% Twaron™, an important factor when constructing thick hoses.

The hybrid fabric may also be coated in rubber before being applied to the hose 10. The rubber coating further increases the strength of the fabric and therefore the durability of the hose 10 when exposed to high loads. The strap peel force, a standard adhesion test, was measured for two different types of rubber applied to each of the three hybrids. For the r838 rubber, the values of the strap peel force for the hybrids are 258 N/cm2, 258 N/cm2 and 241 N/cm2 respectively, which are very similar to 255 N/cm2 for the Twaron™ and 240 N/cm2 for the rayon. For the 5320 rubber, the strap peel force values are 165 N/cm2, 123 N/cm2 and 185 N/cm2 for each of the hybrids, which are again similar to the value of 176 N/cm2 for the Twaron™ and 169 N/cm2 for the rayon.

The T-adhesion was also measured for each of the samples. This is a method of assessing the adhesion between rubber and cords and is the test used by cord manufacturers. Several cords are moulded into a block of rubber, the block being approximately 10 cm long and having a square section of approximately 1 cm. The block is built up in layers and the cords are laid onto the rubber at right angles to the block length as it is built up. The sample is then cured. The cords are pulled individually from the block and the force required to do this is measured. Cords project at one side to allow them to be pulled, and by 1 or 2 mm from the other edge of the block to ensure that they extend right through the block giving a pull length of 10 mm. For the 5320 rubber, the values for each of the three hybrids are 870N, 670N and 740N respectively, which compare to a value of 770N for the Twaron™ control and which are greater than the value of 284N for the rayon control. The values using 5320 rubber are less than those obtained for the r838 rubber. This gave values of 1110N, 1160N and 1140N for the three hybrids, 1200N for the Twaron™ and 262N for the rayon.

These adhesion tests are important since the strength of the hose depends on the ability of the fabric to bond with the rubber and the ability of the rubber layers to bond with each other.

The strength retained after fatigue is another important property of the materials. This is measured using the Akzo Nobel Flex Fatigue (AFF) test. A rubber strip approximately 25 mm wide is flexed around a spindle at a specific load. The rubber strip comprises two cord layers, the upper layer containing a material of very high modulus such as Twaron™ and the lower cord layer containing the cords to be tested. The Twaron™ layer carries almost the full tensile load because of its comparatively high stiffness. The test cords of the bottom layer experience bending, deformation due to axial compression, and pressure from the upper cord layer. Bending and deformation in the presence of this lateral pressure causes degradation of the cord. After the strip has been flexed, the cords are carefully removed from the strip and the retained strength is determined using capstan clamps. In this case, r838 rubber was used and the values were measured both in Newtons and as a percentage. The percentage is the ratio of the retained strength to the strength of the unflexed strip. The values obtained are 46%, 73% and 32% and 850N, 1190N and 620N respectively for the three hybrids and are 32% and 910N for the Twaron™ and 12.7% and 37N for the rayon.

Overall, the strength of the fabric made with the hybrid cord is approximately 4 times greater than the strength of the rayon fabric previously used. The 3 hybrid samples have a fabric strength of 962 kN/m, 822 kN/m and 988 kN/m respectively compared to a fabric strength of 235 kN/m for the rayon. Four layers of this rayon fabric can therefore be replaced with one layer of the fabric woven from the hybrid cord.

Figure 4:
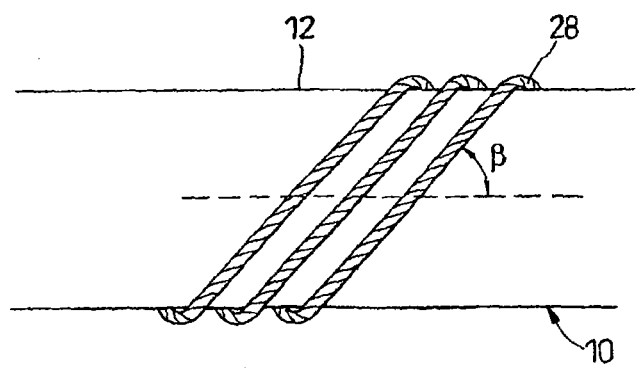
FIG. 4 shows the make-up of a further reinforcing layer of the hose of FIG. 1.

Referring to FIG. 4, in an alternative embodiment the reinforcing layer 14 is formed from cords 28 that are wound round the lining layer 12. Although the cords are shown spaced apart for clarity, they are in practice closely wound so as to form a substantially continuous reinforcing layer 14. The cord 28 is wound at an angle β relative to the longitudinal axis of the hose 10 to provide the hose with the required properties. The value of the angle β determines the physical properties of the hose and is therefore chosen to satisfy most of the design requirements. As in the previous embodiment, the cord is formed from two plies of the aramide Twaron™ 1008 and one ply of polyester Diolen™ 164S twisted together. The Twaron ply is again made from three plies of multifilament 1680 decitex yarn and the polyester is made from three plies of multifilament 1670 decitex yarn.

The embodiments described above are also applicable to the use of suitable aramides and polyesters other than Twaron™ 1008 and Diolen™ 164S.

The invention is not limited to cord formed from a mixture of polyester and aramide fibres, but may also be formed from other combinations of fibres such as nylon and polyester or nylon and aramide. The combination and proportions of fibres used can be selected to obtain the required properties of the cord since different combinations will provide different properties.

The invention claimed is:

1. A crush resistant hose comprising:
    an inner lining, a reinforcing carcass, a crush resistant layer of crush resistant wire, and a cover, wherein the reinforcing carcass is between the inner lining and the crush resistant layer, and wherein the reinforcing carcass comprises a cord, the cord formed from a plurality of plies twisted together, each ply formed from a plurality of multifilament yarns twisted together; wherein
    the multifilament yarns comprise filaments of polyester and filaments of aramide;
    the cord comprises a higher proportion of aramide than of polyester; and
    the cord has a breaking tenacity of 800 mN/tex to 1300 mN/tex and an elongation at breaking point of from 5.5% to 13%.

2. The hose according to claim 1 wherein the cord comprises plies of aramide and plies of polyester and a ratio of the number of plies of aramide to the number of plies of polyester is from 1:1 to 4:1.

3. The hose according to claim 2 wherein the ratio of the number of plies of aramide to the number of plies of polyester is from 1.5:1 to 3:1.

4. The hose according to claim 3 wherein the ratio of the number of plies of aramide to the number of plies of polyester is 2:1.

5. The hose according to claim 1 wherein the reinforcing layer comprises a fabric woven from the cords.

6. The hose according to claim 5 wherein the hose has a longitudinal axis and the cords of the fabric lie at an angle of from 30 degrees to 55 degrees to the longitudinal axis.

7. The hose according to claim 6 wherein the cords of the fabric lie at an angle of approximately 43 degrees to the longitudinal axis.

8. The hose according to claim 1 wherein the reinforcing layer further comprises a lining and the cord is wound around the lining to form a substantially continuous layer.

9. A crush resistant hose comprising:
    an inner lining, a reinforcing carcass, a crush resistant layer of crush resistant wire, and a cover, wherein the reinforcing carcass is between the inner lining and the crush resistant layer, and wherein the reinforcing carcass comprises a cord, the cord formed from a plurality of plies twisted together, each ply formed from a plurality of multifilament yarns twisted together; wherein
    the cord comprises a first ply consisting of a plurality of multifilament yarns each composed exclusively of a first material and a second ply consisting of a plurality of multifilament yarns each composed exclusively of a second material; and
    the cord is coated in rubber which bonds to the cord; and the cord has a breaking tenacity of 800 mN/tex to 1300 mN/tex and an elongation at breaking point of from 5.5% to 13%.

10. A crush resistant hose comprising:
    an inner lining, a reinforcing carcass, a crush resistant layer of crush resistant wire, and a cover, wherein the reinforcing carcass is between the inner lining and the crush resistant layer, and wherein the reinforcing carcass comprises a cord, the cord formed from a plurality of plies twisted together, each ply formed from a plurality of multifilament yarns twisted together; wherein
    the cord comprises a first ply consisting of a plurality of multifilament yarns each composed exclusively of a first material and a second ply consisting of a plurality of multifilament yarns each composed of a second material;
    the cord is coated in rubber which bonds to the cord;
    each ply has a twist of from 160 to 200 turns per meter; and
    the twist of each of the plies is selected such that the cord has a breaking tenacity of 800 mN/tex to 1300 mN/tex and an elongation at breaking point of from 5.5% to 13%.

* * * * *